Dec. 13, 1955  W. E. MEISSNER  2,726,620
MACHINE FOR WELDING AND CLADDING
Filed Nov. 12, 1952  2 Sheets-Sheet 1
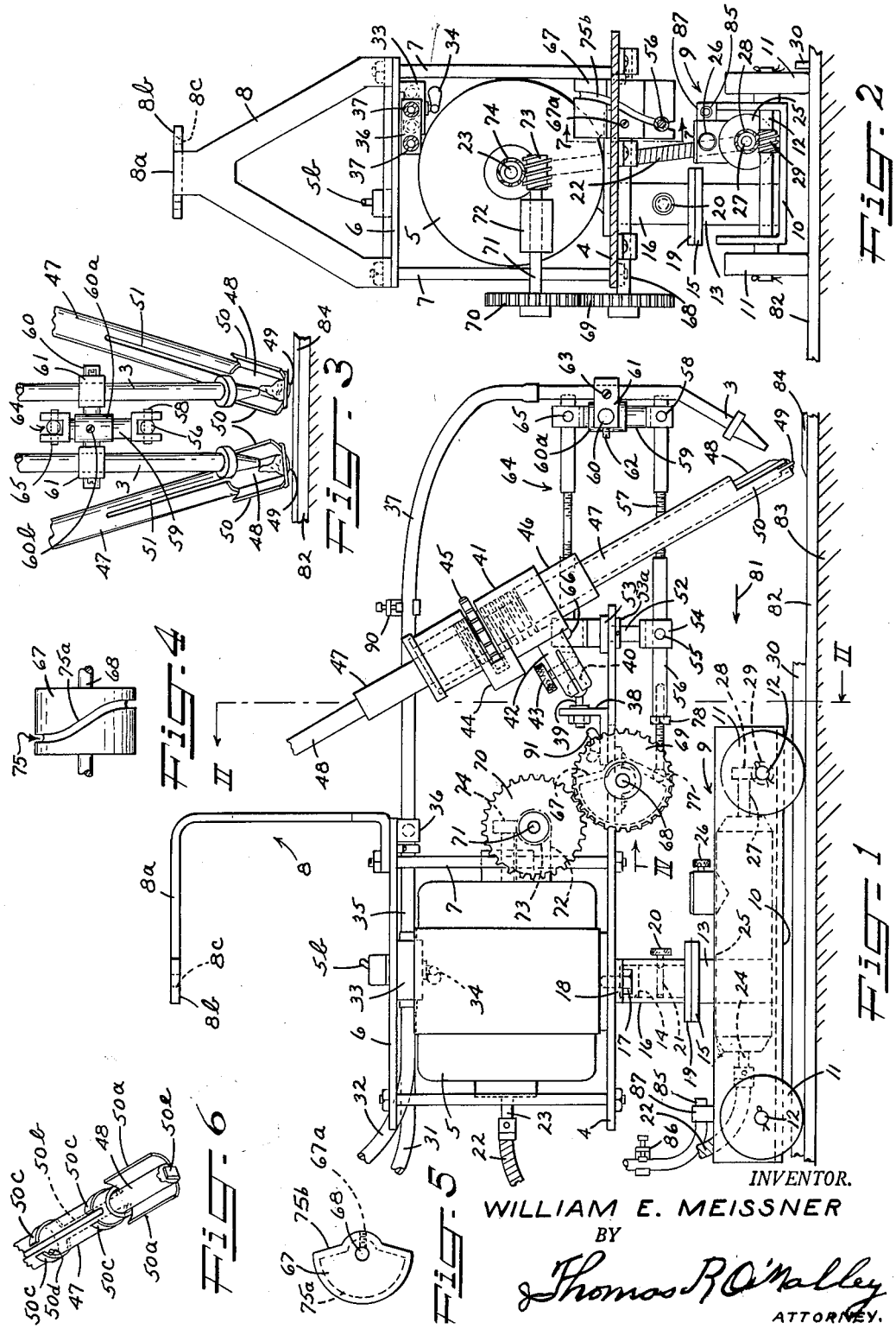
INVENTOR.
WILLIAM E. MEISSNER
BY
Thomas R O'Malley
ATTORNEY.

United States Patent Office 2,726,620
Patented Dec. 13, 1955

2,726,620

MACHINE FOR WELDING AND CLADDING

William E. Meissner, New York, N. Y., assignor to American Viscose Corporation, Philadelphia, Pa., a corporation of Delaware Application November 12, 1952, Serial No. 320,073

17 Claims. (Cl. 113—59)

This invention relates to machines for welding two or more strips or sheets of material together or for cladding one sheet with a fusible material. The invention is particularly applicable to the handling of fusible metals, such as lead rods for the purpose of lead burning or cladding plates of metals, such as steel with lead. However, it is applicable as well to welding or fusing together adjoining strips or plates of other fusible materials whether of metallic or non-metallic character, such as of plastic materials. It is also applicable for the purpose of cladding either metallic or non-metallic strips or plates with either metallic or non-metallic materials. The term "bonding" as used herein is intended to cover generically the joining of two pieces of material by the application of a fusible material in the manner of the processes generally referred to as welding and lead burning, as well as to the building up of a coating of the fusible metal upon the surface of another material, especially another metal, as in cladding.

It is a primary object of the present invention to provide a machine of this type which is of extremely light weight so that it is portable with ease and requires relatively little power for its operation. An ancillary object is to provide an improved construction of such machine in respect particularly to the mechanism for operating the torch or torches and also with respect to the feeding of the fusible material to the position of fusion. Other objects and advantages of the invention will be apparent from the drawing and the following description thereof.

In the drawing, which is illustrative of a preferred embodiment of the invention, Figure 1 is a side elevation, Figure 2 is a section taken on line II—II of Figure 1, Figure 3 is a front view of the torches and fusible rod feeding devices, Figure 4 is a view of the driving cam taken in the direction of the arrow IV in Figure 1, Figure 5 is a detail of the side of the cam only as would be seen at VII—VII of Figure 2;

Figure 6 shows a modified support for a fusible material;

Figure 7:
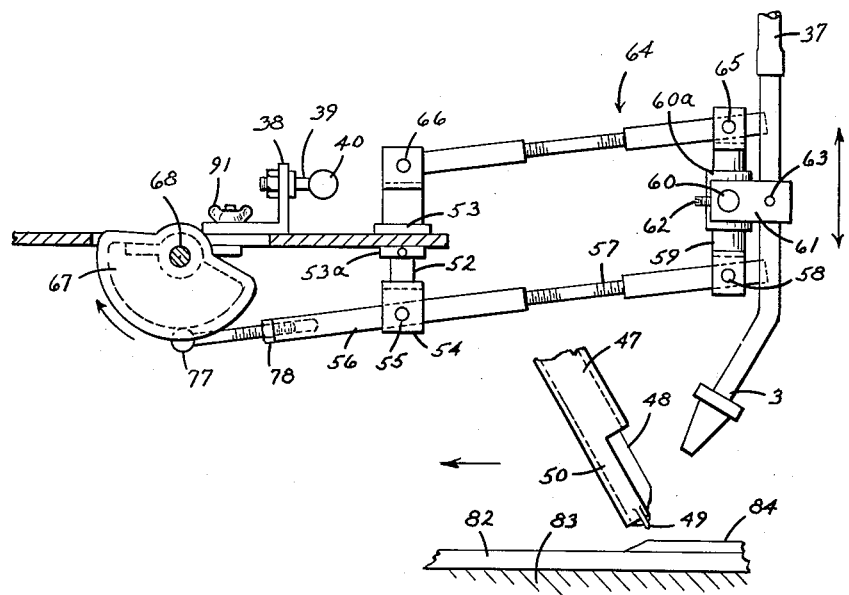
Figure 7 is an enlarged sectional detail as seen at VII—VII of Figure 2.
Figure 8:
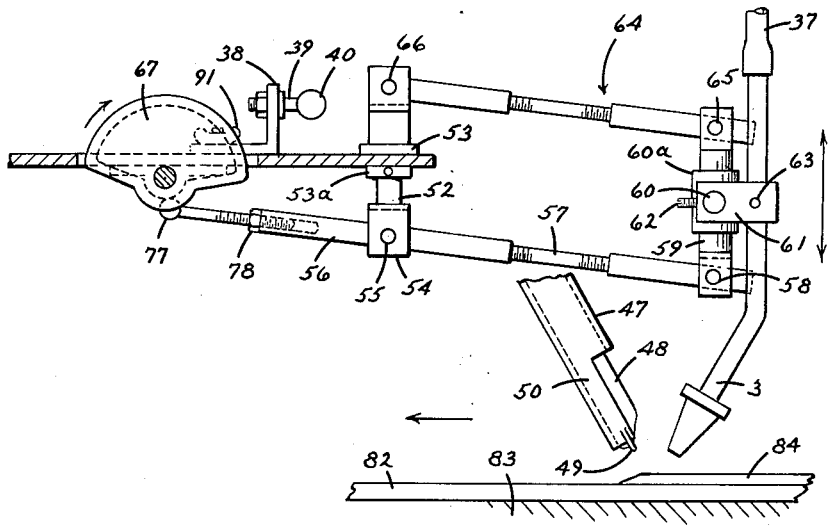
Figure 8 shows the structure of Figure 7 in a moved position.

The machine of the present invention is a light weight, portable machine having a weight on the order of from 8 to 15 pounds total and it comprises one or more torches 3 which is or are mounted for certain relative movements upon a platform 4 to which the driving motor 5 is secured. An upper plate 6 may be secured to the platform 4 by means of a plurality of tie rods or bolts 7 (four being shown) and a bracket 8 may be secured to the plate 6. A switch 5b on plate 6 controls the electric motor 5. The bracket or arm 8 has a rearwardly extending portion 8a terminating a fastening lug or member 8b having threaded bores 8c by which the truck or carriage shown beneath the platform 4 may be, when and if desired, secured above the motor 5 to suspend the machine from above as will be explained hereinafter. The bracket 8 with the rearwardly extending arm 8a may also serve as a handle by which the operator may guide the movements of the machine, when and if desired as will be explained hereinafter.

As actually shown in Figure 1, the platform or carrier 4 is mounted upon a truck or carriage 9 which may simply comprise a channel 10 mounted upon casters or wheels such as the wheels 11 which are mounted on axles 12 extending through suitable bores in the upwardly extending webs of the channel. The truck 9 may be connected to the platform 4 by any suitable means, preferably by means of a swivel connection as shown. This connection comprises a rigid flanged post 13 secured to the channel 10 having an upwardly extending rod or post 14 projecting above the flange 15. A sleeve 16 is secured to the bottom of platform 4 by means of cap screws 17 which extend through laterally projecting lugs 18 on the sleeve. The sleeve 16 fits rotatably about the post 14 and has a flange 19 bearing upon the upper surface of the flange 15. A set screw 20 is threadedly secured in the sleeve 16 and engages an annular groove 21 on the post 14. This connection allows the swinging of the platform so that the torches and fusible rod feed may operate upon a strip or area which is displaced laterally to either side of the path normally taken by the truck 9.

As shown in the drawing, driving means is provided between the motor 5 and one of the shafts 12 upon which the wheels 11 are secured. Thus, a flexible cable 22 connects the rear end of shaft 23 of the motor 5 to a shaft 24 of a gear reducer shown in dotted outline at 25 whose speed ratio may be varied by adjusting the knurled nut 26. The output shaft 27 of the speed reducer carries a spiral gear 28 in engagement with a spiral gear 29 rigidly secured to the shaft 12. Driving means is thus provided for moving the machine along the work either right on top of the work or upon a table or other platform supporting the work adjacent the path of travel of the machine. If desired, a guide rail 30 (see Figure 2) may be temporarily clamped to the top of the work or the platform upon which the machine is moved. There may be instances when it is not desired to drive the wheels in which case the flexible cable 22 may be disconnected from either shaft 23 or shaft 24. When this is done and the machine is moved manually, it is preferred that the wheels 11 be in the form of casters so that the operator has greater freedom of movement for controlling the travel of the machine. It should be understood, however, that if desired, the machine may be allowed to remain stationary while the element or elements, such as strips or plates, to be welded together or to be clad is or are moved either by hand or by any suitable power driving means past the torch or torches 3.

The gases may be directed to the torches 3 by any suitable means. As shown, a pair of flexible conduits 31 and 32 are connected to a mixing valve 33 which may be controlled by the lever 34. For example, one of conduits 31 and 32 may be connected to a supply of oxygen and the other to hydrogen or acetylene or other combustible gas which sources may be in the form of conventional compressed gas cylinders suitably deposited upon the floor or any other table or platform near the work. It is, however, neither necessary nor desirable to mount the cylinders upon the platform 4 since the flexible conduits 31 and 32 may be made of sufficient length to allow adequate freedom of movement to the machine during operation. The mixing valve 33 is connected by a single conduit 35 to a header 36 secured under the plate 6 and this header 36 is connected by a corresponding number of flexible conduits 37 to the individual torches 3. Means, such as adjustable valves or pinch clamps 90 may be provided in or on each of the conduits 37 for individually controlling the flow of gas to the nozzles.

Means may be provided for supporting a strip or rod of fusible material, such as the lead in the case of lead burning or cladding. Preferably the construction is such as to provide a universal connection between the platform and the support for the fusible strip. Such means may comprise a bracket 38 secured to platform 4 which carries a rod 39 having a spherical terminal knob 40. The bracket 38 may be secured to the platform 4 for easy removal, as by wingnuts 91, when it is desired to bond without feeding fusible rods 48 as will be explained hereinafter. The support also comprises a sleeve 41 having a bifurcated extension 42 adapted to be clamped about the knob 40. An adjusting screw 43 is provided for loosening or tightening the grip of the two legs of bifurcate clamp 42 about the sperical knob 40. The outer ends of the legs are provided with herispherical recesses to cooperate with the knob 40 and the legs are sufficiently resilient to spring apart when the screw 43 is loosened. The sleeve 41 has a lateral extension 44 extending about a transverse slot through the sleeve. This slot receives the rotatable knurled ring or collar 45 which has an internal screw thread engaging the threads upon a sleeve 46 within which is secured an inclined tube 47. The tube 47 extends clear through the sleeve 46 with which it is secured rigidly, such as by press fitting, and receives the rod 48 of fusible material. The rod 48 fits freely within the tube 47 so that it slides downwardly by gravity until it comes to rest upon a transverse detent 49 which may take the form of a rod or wire 49 secured to opposite sides of the tube 47. As shown, the lower end of tube 47 is split at one side and the adjoining areas are sprung or bent out into flame catching wings 50. The outspread wings 50 tend to retain the heat and direct the flame from the nozzle of the torch so that even while the torch is passing through the upper transverse reciprocation the heat of the flame is not deflected completely from the fusible rod within the tube 47. This will be explained more completely hereinafter. As shown in Figure 3, each tube 47 may also be provided with a slot 51 extending up from the lower winged portion for the purpose of facilitating inspection to determine the length of fusible material remaining at any particular time.

Figure 6 shows a modified support for the fusible rod in which the winged lower portion is formed of a piece of material that is separate from the main tube 47. This fitting may be stamped out of a single piece of material and bent to the shape shown wherein the wings 50a and clamping fingers 50c project outwardly from the main shank 50b. The fingers 50c can then readily be bent about the tube 47 to grip it firmly. A screw or knob 50d may project from the tube 47 to prevent the fitting from sliding off the tube 47. A platform 50e may be bent up from the shank to support the fusible rod 48. This fitting has the advantage of being easily and rapidly replaced when necessary because of the severe corrosion and oxidation resulting from the torch flames.

Means is provided for supporting the torch or torches and for imparting proper relative motion thereto as follows. This mounting comprises a swivel pin 52 having a flanged head 53 resting upon the top of the platform 4. The pin 52 is free to rotate or oscillate within a bore in the platform 4 through which it extends. The lower end of pin 52 terminates in a yoke 54 between the two legs of which a pin 55 extends for pivotably supporting a lever 56 and may be retained vertically in plate 4 by any suitable means such as a collar 53a. The lever 56 as shown comprises two sections the opposed ends of which have threaded bores of opposite hand receiving the ends of the tie rod 57 which are provided with threads of opposite hand. This provides for increasing or decreasing the length of the lever 56 with ease. The outer projecting end of lever 56 is pivotably mounted at 58 within a yoke at the end of a link 59 the main body of which is cylindrical. A pair of arms 60 project in opposite directions from a sleeve 60a which may be adjusted rotatably or axially along the link 59 and set in adjusted position by screw 60b. On each arm 60, a torch or a plurality of torches 3 may be mounted. The mounting shown comprises a fitting 61 having a bore to receive the arm 60 upon which it may be set in any adjusted position by a set screw 62 and another bore at right angles and offset from the first mentioned bore to receive the conduit of the torch 3 which may be fixed in position by a set screw 63. The upper end of the link 59 terminates in a yoke within which a link 64 is pivotably mounted at 65. The other end of link 64 is pivotably mounted at 66 within a yoke secured to the upper end of the swivel pin 52. The linkage comprising lever 56, link 59, pin 52, and link 64 constitutes a parallel motion mechanism. The link 59 takes various positions which are parallel to one another. The vertical disposition of link 59 imparts a substantially vertical shifting motion to the torches during the operation to be described.

The means for imparting relative motion to the torch support comprises an interchangeable cam 67 which is replaceably secured by a set screw 67a upon a shaft 68 carried in suitable bearings beneath the platform 4. One end of the shaft 68 is rigidly secured to a spur gear 69 which is driven by a spur gear 70 secured to a shaft 71 extending through a bearing 72 and carrying a driven spiral gear 73 thereon. The gear 73 is driven by the spiral gear 74 upon the shaft 23 on the front end of the shaft 23 of the motor 5. While other forms of cam may be used, the now preferred form is clearly shown in Figures 4 and 5. As shown, it amounts to a "mutilated," "deformed," or "modified" cylindrical cam having a portin 75a of its cam track or groove 75 along a cylindrical periphery of the cam which extends approximately 180° about the axis thereof in an arc concentric with the axis. The remainder of the cylindrical periphery is cut away so that the other connecting portion 75b of the cam track projects along the cut away portion as indicated in Figures 2 and 5. This mutilated cylindrical cam is engaged by a follower 77 projecting from the end of lever 56. The follower 77 may be threaded and engage a threaded bore in the end of lever 56 so that its distance of projection from the end of lever 56 may be varied and finally set by the lock nut 78. The weight of the torch 3 and the linkage supporting it serves to retain the follower 77 in the cam groove at all times.

Means for cooling the carriage and operating parts may be provided. This may take the form of a small fan or blower or a tube connected to any source of a cooling gas, such as compressed air. As shown in Fig. 1, the tube 85, connected to a source of compressed air and provided with a control valve or pinch clamp 86, is secured to the truck 9 by the bracket or clamp 87 and oriented to direct a controllable blast of air toward the front of the machine, thereby preventing the heated gases from the torches from overheating the operating parts, and especially the motor 5. As will be observed in Figure 4, the cylindrical portion 75 of the cam groove moves the torch sidewise while it is in elevated position. It is during this stroke that melting of the lead or other fusible material is effected. At the end of the cylindrical portion 75a of the cam track 75, the follower 77 proceeds along the non-cylindrical portion 75b and this allows the follower 77 to approach more nearly the axis of shaft 68, thereby lowering the torch or torches and simultaneously gradually moving the torches in the other direction transversely of the work. After the cam has rotated about 90° from the shift from cylindrical to non-cylindrical cam tracks, the follower 77 is forced away from axis 68 so that the torches are again elevated as they approach the end of the transverse stroke. This is followed by a repetition of the cycle which is discussed more completely hereinbelow.

The system of the present invention is greatly simplified relative to prior machines of this type for several reasons. One of the most important is the fact that, when the machine must feed the fusible material, a gravity feed is depended upon for the feeding of the fusible material, such as the fusible rod 48. This makes it unnecessary to provide a special driving mechanism to feed such fusible material to the point of bonding. Another simplification results from the provision of a common cam for imparting both the vertical and transverse motions to the torch or torches. This requires proper swivel and pivotal mounting of the lever supporting the torch or torches. The reduction in the driving systems required allows the use of a much smaller motor and because of the reduction in weight, gear reducers or other types of speed reducing mechanism at 25 may be made of much smaller size and capacity, since greatly reduced powers are needed when the machine of reduced weight is to be driven along a track or guideway. For example, a variable speed drive of the type described in Bulletin No. 99 of the Metron Instrument Company, Denver, Colorado, may be coupled with additional fixed ratio speed reducers such as those described in Bulletin No. 100 of the Metron Instrument Company. The end result of the simplification and reduction in size of the parts because of the lower power requirements enables a machine of this type to be built with a weight of from 8 to 15 or 20 pounds total.

If it is desired to move the machine by hand or if it is desired to hold the machine in fixed position while the work to be welded, bonded or clad is moved past the torch flames, the flexible cable 22 and gear reducer 25 may be omitted with a further reduction in weight. In the latter instance when the machine is to be fixed to a stationary support, the lower truck 9 may be removed and replaced with a suitable pedestal for attachment to the platform 4 through the swivel connection comprising post 14 and sleeve 16.

When the machine is to be driven along the work, it may be supported directly on top of the work and one or two guide rails, such as that shown at 30, may be disposed on opposite sides of the wheeled carriage or track. Such guide rail on rails may be temporarily clamped in fixed position on top of the work for this purpose. During operation of the machine, it moves in the direction indicated by the arrow 81 in Figure 1. The torches may be disposed directly in front of the truck 9 so as to effect bonding along a line coincident with the path of the machine. However, the swivel joint between the post 14 and sleeve 16 allows the platform 4 to be swung so as to position the torches on either side of such a line so that bonding would be effected along a line offset completely to one side of the truck 9. Of course, the swivel joint may be set so as to effect bonding along any line between these two extremes as desired. When the platform 4 is swung so that the torches bond along a line offset completely to one side of the truck 9, the truck 9 may ride on top of the work or the work may be disposed entirely to one side of the truck and the edge of the work, if it happens to be a strip or sheet of material having a straight edge, may be used as one of the guide rails for the truck. In the latter situation, the truck and the work may be supported on a table, bench or platform alongside one another and an additional guide rail may be temporarily clamped upon the platform to guide the wheels, on the opposite side of the track, if desired.

The machine as shown in Figures 1 and 2 is mounted so as to be positioned above the work and the platform carrying the work. However, the machine may be suspended from above. If it is to be suspended in a fixed position, it may be secured to a fixed support overhead by means of bolts extending through bores 8c of the fastening lug 8b. On the other hand, the truck 9 may be removed from beneath the platform 4 such as by loosening the screws 17 and then the truck may be inverted and placed with the lugs 18 on top of the fastening lug 8b where it may be fastened to such lug by cap screws or bolts. When so assembled, the machine may be suspended from an overhead rail or rails the wheels 11 riding upon the rails. Whether the machine is suspended from above or supported below, the work may be moved along underneath the torches either by hand or by power driving mechanisms or it may be held in fixed position and the machine moved relative to the work.

In the relationship shown in Figures 1 to 3, the truck 9 is shown riding on top of a sheet 82 of material to be clad, such as a sheet of steel. This sheet of work is supported by allowing it to rest upon the upper surface 83 of a suitable support, such as a floor, table, platform or bench. The layer of cladding material previously deposited by the machine is shown at 84. As indicated hereinabove, the machine may employ a single torch 3 associated with a suitable single fusible material feeding system. This use of a single torch would be particularly useful when it is merely desired to weld two parts together or to join the edges of two strips or plates of materials. However, it can be used for the purpose of laying down a cladding layer. As is well known, this involves the passage of the machine repeatedly along parallel paths so as to deposit successive strips of cladding material adjacent one another so that they fuse into one another so as to bond into the surface of the strip or plate of material to be clad. By using two more torches, a wider strip of the cladding material may be deposited during each passage of the machine over or along the work.

The machine may be used to clad or bond one or more strips of fusible material that are laid down directly upon the surface of the plate to be clad. The machine is then moved along the strip or strips so that the torches work upon successive portions or segments of the strip or strips from one end to the other. During this operation, the fusible rod feeding devices may be removed entirely by loosening the wingnuts 91. However, is desired, the fusible cladding material of the strip laid down may be supplemented by fusible material supplied by rods 48.

The motion of the torch relative to the work and the fusible material generally accomplishes the following purposes. When the torch is in its upper position wherein it traverses the flame across the lower end of the fusible rod 48, it melts off the lower end of such rod allowing it to drop down upon the surface of the member 82 which is being clad or joined to an adjacent workpiece. The wings 50 keep the flame and the heat thereof in effective contact with the lower tip of the fusible rod 48 practically throughout the entire transverse upper stroke of the torch. At the end of this upper transverse stroke, the torch moves downwardly and directs its flame upon the molten material deposited by the first-mentioned upper stroke. This downward stroke is accompanied by a return transverse stroke and during this lower transverse stroke, not only is the freshly deposited molten material reheated to cause it to bond with adjacent surfaces including the surface of the sheet to be clad or joined as well as to the adjacent strip, if any, of previously deposited cladding material, but it also preheats the adjoining area of the sheet 82 in preparation for the next deposit of fusible material to be made by the succeeding upper transverse stroke. As the torch nears the end of its lower transverse stroke, it moves upwardly in preparation for the next upper transverse stroke which is thereafter effected immediately in the opposite direction to that of the lower transverse stroke. This cycle of operation is continually repeated as long as cladding, joining or bonding by the material is desired. When the operator notes that the fusible material is coming toward its end as may be determined by looking into the inspection slots 51, he may merely insert additional rods or strips of the fusible material into the upper ends of tubes 47 without interrupting the operation of the machine. The transverse supporting wire or strip 49 and at least the lower end of tube 47 including the wings 50 should be made of material which is not fused by the heat of the flames from the torch 3.

The machine of the present invention may be used to join together any metallic or non-metallic materials. For example, strips or plates of a fusible plastic material may be joined together by passing the juncture between the plates beneath the torch system of the present invention while employing rods 48 of a fusible material, such as any plastic which properly adheres to the plastic sheets to be joined. The rods 48 may be of the same or of a different plastic than that of which the strips or plates to be joined are formed. The machine may also be used for joining together two plates or strips of fusible metals by the use of a fusible rod 48 of a fusible metal which may be the same or different from the metal of which the sheets to be joined are formed. Besides the welding or bonding of two materials, either of metallic or non-metallic materials as just described, the machine may be used to clad such metallic or non-metallic materials; for example, a strip or sheet of plastic or of a metal may be clad with a coating of another plastic or metal respectively in the manner hereinabove described. The invention is therefore particularly useful in cladding such metal sheets as those of steel with copper or lead to produce clad products which have the strength of the steel and the corrosion-resistance of the lead or the strength of steel and the electrical-conductivity or heat-conducting properties of copper. Steel plates clad with lead, for example, are particularly useful in the formation of reaction vessels for the chemical industry.

It is to be understood that changes and variations may be made without departing from the spirit and scope of the invention as defined in the appended claims.

I claim:

1. A machine for bonding with fusible materials comprising a carrier, a torch, means on the carrier for supporting a strip of fusible material with its lower end in proximity to the torch, detent means on said fusible material supporting means whereby the gravitational descent of the fusible material can be controlled, means connected to the carrier for supporting the torch, and means on the carrier for reciprocating the torch both transversely and upwardly and downwardly with respect to the lower end of the fusible material.

2. A machine for bonding with fusible materials comprising a carrier, a torch, means on the carrier for supporting a strip of fusible material with its lower end in proximity to the torch, means connected to the carrier for supporting the torch, and a cam on the carrier for reciprocating the torch both transversely and upwardly and downwardly with respect to the lower end of the fusible material.

3. A machine for bonding with fusible materials comprising a carrier, a torch, adjustable means on the carrier for supporting a strip of fusible material in fixed position relative to the carrier with its lower end in proximity to the torch, detent means on said fusible material supporting means whereby the gravitational descent of the fusible material can be controlled, means connected to the carrier for supporting the torch, and means on the carrier for reciprocating the torch both transversely and upwardly and downwardly with respect to the lower end of the fusible material.

4. A machine for bonding with fusible materials comprising a carrier, a torch, adjustable means on the carrier for supporting a strip of fusible material in fixed position relative to the carrier with its lower end in proximity to the torch, means connected to the carrier for supporting the torch, and a cam on the carrier for reciprocating the torch both transversely and upwardly and downwardly with respect to the lower end of the fusible material.

5. A machine for bonding with fusible materials comprising a carrier, a torch, means on the carrier for supporting a strip of fusible material with its lower end in proximity to the torch, said supporting means being constructed to allow gravitational descent of the strip of fusible material as its lower end is fused off, detent means on said fusible material supporting means for controlling the gravitational descent of the fusible material, means connected to the carrier for supporting the torch, and means on the carrier for reciprocating the torch both transversely and upwardly and downwardly with respect to the lower end of the fusible material.

6. A machine for bonding with fusible materials comprising a carrier, a torch, means on the carrier for supporting a strip of fusible material in fixed position relative to the carrier with its lower end in proximity to the torch, said supporting means comprising an inclined holder within which the strip of fusible material is free to move downwardly under the influence of its own weight and detent means within the zone of fusion at the lower end of the strip for controlling the gravitational descent of the strip in accordance with the extent of removal of fusible material by fusion, means connected to the carrier for supporting the torch, and means on the carrier for reciprocating the torch both transversely and upwardly and downwardly with respect to the lower end of the fusible material.

7. A machine for bonding with fusible materials comprising a carrier, a torch, means on the carrier for supporting a strip of fusible material with its lower end in proximity to the torch, said supporting means comprising an inclined holder within which the strip of fusible material is free to move downwardly under the influence of its own weight and detent means within the zone of fusion at the lower end of the strip controlling the gravitational descent of the strip in accordance with the extent of removal of fusible material by fusion, means connected to the carrier for supporting the torch, and a cam on the carrier for reciprocating the torch both transversely and upwardly and downwardly with respect to the lower end of the fusible material.

8. A machine for bonding with fusible materials comprising a carrier, a torch, adjustable means on the carrier for supporting a strip of fusible material in fixed position relative to the carrier with its lower end in proximity to the torch, said supporting means comprising an inclined holder within which the strip of fusible material is free to move downwardly under the influence of its own weight and detent means within the zone of fusion at the lower end of the strip for controlling the gravitational descent of the strip in accordance with the extent of removal of fusible material by fusion, means connected to the carrier for supporting the torch, and a cam on the carrier for reciprocating the torch both transversely and upwardly and downwardly with respect to the lower end of the fusible material.

9. A machine for bonding with fusible materials comprising a carrier, a torch, means on the carrier for supporting a strip of fusible material with its lower end in proximity to the torch, said supporting means being constructed to allow gravitational descent of the strip of fusible material as its lower end is fused off, and means for supporting and reciprocating the torch in different directions comprising a member swivelly mounted on the carrier, a lever connected to the torch and pivotally mounted on the member on an axis transverse to that of the swivel axis, a cam supported by the the carrier, a follower in engagement with the cam and carried by the lever, and means for driving the cam.

10. A machine as defined in claim 9 in which the cam is a rotatable cam comprising a cylindrical cam track portion concentric with the cam axis and an adjoining non-cylindrical cam track portion along which the follower is first brought closer to the cam axis and then moved away from such axis, said track portions being inclined to the axis to provide reciprocation of the follower axially in different directions in each portion.

11. A machine for bonding with fusible materials comprising a carrier, a torch, means on the carrier for supporting a strip of fusible material with its lower end in proximity to the torch, said supporting means comprising an inclined holder within which the strip of fusible material is free to move downwardly under the influence of its own weight and detent means within the zone of fusion at the lower end of the strip for controlling the gravitational descent of the strip in accordance with the extent of removal of fusible material by fusion, and means for supporting and reciprocating the torch comprising a member swivelly mounted on the carrier, a lever connected to the torch and pivotally mounted on the member on an axis transverse to that of the swivel axis, a cam supported by the carrier, a follower in engagement with the cam and carried by the lever, and means for driving the cam.

12. A machine as defined in claim 11 in which the cam is a rotatable cam comprising a cylindrical cam track portion concentric with the cam axis and an adjoining non-cylindrical cam track portion along which the follower is first brought closer to the cam axis and then moved away from such axis, said track portions being inclined to the axis to provide reciprocation of the follower axially in different directions in each portion.

13. A machine for bonding with fusible materials comprising a carrier, a torch, means on the carrier for supporting a strip of fusible material with its lower end in proximity to the torch; said supporting means comprising a sleeve, means comprising a universal joint for adjustably mounting the sleeve on the carrier in a position inclined to the horizontal, a tube in the sleeve for receiving a strip of fusible material for gravitational descent therein and a detent at the lower end of the tube for controlling the descent of the strip in accordance with the extent of removal of fusible material from the lower end of the strip by fusion; means connected to the carrier for supporting the torch, and means on the carrier for reciprocating the torch both transversely and upwardly and downwardly with respect to the lower end of the fusible material.

14. A machine in accordance with claim 13 in which the lower end of the tube is open on the side adjacent the torch and wings extend laterally on each side of the open end of the tube to catch the torch flame and direct it to the fusible material during traverse of the torch.

15. A machine for bonding with fusible material comprising a carrier, a torch, adjustable means on the carrier for supporting a strip of fusible material in fixed position relative to the carrier with its lower end in proximity to the torch; said supporting means comprising a sleeve, means comprising a universal joint for adjustably mounting the sleeve on the carrier in a position inclined to the horizontal, a tube in the sleeve for receiving a strip of fusible material for gravitational descent therein, and a detent at the lower end of the tube for controlling the descent of the strip in accordance with the extent of removal of fusible material from the lower end of the strip by fusion; means connected to the carrier for supporting the torch, and a cam on the carrier for reciprocating the torch both transversely and upwardly and downwardly with respect to the lower end of the fusible material.

16. A machine for bonding with fusible materials comprising a carrier, a torch, adjustable means on the carrier for supporting a strip of fusible material in fixed position relative to the carrier with its lower end in proximity to the torch; said supporting means comprising a sleeve, means comprising a universal joint for adjustably mounting the sleeve on the carrier in a position inclined to the horizontal, a tube in the sleeve for receiving a strip of fusible material for gravitational descent therein, and a detent at the lower end of the tube for controlling the descent of the strip in accordance with the extent of removal of fusible material from the lower end of the strip by fusion; and means for supporting and reciprocating the torch comprising a member swivelly mounted on the carrier, a lever connected to the torch and pivotally mounted on the member on an axis transverse to that of the swivel axis, a cam supported by the carrier, a follower in engagement with the cam, and carried by the lever, and means for driving the cam, said cam being a rotatable cam comprising a cylindrical cam track portion concentric with the cam axis and an adjoining non-cylindrical cam track portion along which the follower is first brought closer to the cam axis and then moved away from such axis, said track portions being inclined to the cam axis to provide reciprocation of the follower axially in different directions in each portion, a truck for supporting the carrier thereon, a swivel connection between the truck and carrier, means for driving the truck, and a motor on the carrier for operating the cam driving means and the truck driving means.

17. A supporting and reciprocating system for a torch comprising a torch, a carrier, and means for supporting and reciprocating the torch with respect to the carrier comprising a member swivelly mounted on the carrier, a lever connected to the torch and pivotally mounted on the member on an axis transverse to that of the swivel axis, a cam supported by the carrier, a follower in engagement with the cam, and carried by the lever, and means for driving the cam, said cam being a rotatable cam comprising a cylindrical cam track portion concentric with the cam axis and an adjoining non-cylindrical cam track portion along which the follower is first brought closer to the cam axis and then moved away from such axis, said track portions being inclined to the axis to provide reciprocation of the follower axially in different directions in each portion.

References Cited in the file of this patent

UNITED STATES PATENTS

| | | |
|---|---|---|
| 1,477,538 | Carter et al. | Dec. 12, 1923 |
| 1,938,819 | Eskilson | Dec. 12, 1933 |
| 2,036,734 | Kehl | Apr. 7, 1936 |
| 2,176,891 | Crom | Oct. 24, 1939 |
| 2,524,896 | Downing | Oct. 10, 1950 |
| 2,527,275 | Pacent | Oct. 24, 1950 |